US012527705B2

(12) United States Patent
Thota et al.

(10) Patent No.: US 12,527,705 B2
(45) Date of Patent: Jan. 20, 2026

(54) PATIENT SUPPORT APPARATUS FOR SENSING AND RESPONDING TO AN EMERGENCY EVENT

(71) Applicant: Stryker Corporation, Kalamazoo, MI (US)

(72) Inventors: Madhu Sandeep Thota, Portage, MI (US); Charles Donald Baker, Jr., Portage, MI (US)

(73) Assignee: Stryker Corporation, Portage, MI (US)

( * ) Notice: Subject to any disclaimer, the term of this patent is extended or adjusted under 35 U.S.C. 154(b) by 407 days.

(21) Appl. No.: 17/915,185

(22) PCT Filed: May 27, 2021

(86) PCT No.: PCT/US2021/034401
§ 371 (c)(1),
(2) Date: Sep. 28, 2022

(87) PCT Pub. No.: WO2021/242949
PCT Pub. Date: Dec. 2, 2021

(65) Prior Publication Data

US 2023/0157912 A1 May 25, 2023

Related U.S. Application Data

(60) Provisional application No. 63/030,585, filed on May 27, 2020.

(51) Int. Cl.
*A61G 7/018* (2006.01)
*A61G 7/05* (2006.01)

(52) U.S. Cl.
CPC ........... *A61G 7/018* (2013.01); *A61G 7/0506* (2013.01)

(58) Field of Classification Search
CPC ................................ A61G 7/018; A61G 7/015
See application file for complete search history.

(56) References Cited

U.S. PATENT DOCUMENTS

| | | | | |
|---|---|---|---|---|
| 4,953,243 | A | 9/1990 | Birkmann | |
| 6,691,346 | B2 * | 2/2004 | Osborne | A61G 7/052 5/616 |

(Continued)

FOREIGN PATENT DOCUMENTS

| | | | |
|---|---|---|---|
| JP | 2009115298 | A | 5/2009 |
| WO | 02078589 | A1 | 10/2002 |

OTHER PUBLICATIONS

International Search Report for Application No. PCT/US2021/034401 dated Aug. 25, 2021, 1 page.

(Continued)

*Primary Examiner* — Eric J Kurilla
(74) *Attorney, Agent, or Firm* — Howard & Howard Attorneys PLLC

(57) ABSTRACT

A patient support apparatus is provided for sensing and responding to an emergency event. The patient support apparatus includes a plurality of actuators to lift and lower a patient relative to a floor surface and to articulate one or more deck sections. An activator is coupled to the support structure to be actuated by a user to signal the emergency event. A plurality of electronic motion locks can be configured to a locked or unlocked state. In the locked state, a controller prevents operation of one or more of the actuators. The controller is configured to automatically reset the motion locks to their unlocked states in response to detecting the emergency event.

15 Claims, 7 Drawing Sheets

(56) References Cited

U.S. PATENT DOCUMENTS

| | | | | |
|---|---|---|---|---|
| 6,820,294 | B2 | 11/2004 | Shiery et al. | |
| 7,055,195 | B2 | 6/2006 | Roussy | |
| 7,395,564 | B2 | 7/2008 | McDaniel et al. | |
| 7,699,784 | B2 * | 4/2010 | Wan Fong | A61B 5/6887<br>600/534 |
| 7,836,531 | B2 | 11/2010 | Girard et al. | |
| 8,006,332 | B2 | 8/2011 | Lemire et al. | |
| 8,151,387 | B2 | 4/2012 | Osborne et al. | |
| 9,555,778 | B2 | 1/2017 | Lemire et al. | |
| 10,258,538 | B2 | 4/2019 | Barta et al. | |
| 10,492,968 | B2 | 12/2019 | Elku et al. | |
| 10,952,925 | B2 | 3/2021 | Centen | |
| 2005/0235418 | A1 | 10/2005 | Jacques et al. | |
| 2006/0049936 | A1 | 3/2006 | Collins et al. | |
| 2006/0101581 | A1 | 5/2006 | Blanchard et al. | |
| 2007/0174965 | A1 * | 8/2007 | Lemire | A61G 7/0528<br>5/630 |
| 2009/0063183 | A1 | 3/2009 | McNeely et al. | |
| 2010/0064441 | A1 | 3/2010 | Barthelt | |
| 2011/0083271 | A1 | 4/2011 | Bhai | |
| 2012/0089419 | A1 * | 4/2012 | Huster | A61G 7/015<br>705/3 |
| 2013/0205501 | A1 | 8/2013 | Robertson et al. | |
| 2015/0000035 | A1 * | 1/2015 | Becker | A61G 7/0509<br>5/617 |
| 2015/0164722 | A1 | 6/2015 | Roussy et al. | |
| 2016/0235610 | A1 * | 8/2016 | Drake | A61B 5/165 |
| 2018/0110667 | A1 * | 4/2018 | Freeman | A61G 13/04 |
| 2019/0183700 | A1 | 6/2019 | Roussy et al. | |
| 2020/0008993 | A1 | 1/2020 | Poulos et al. | |
| 2020/0107983 | A1 | 4/2020 | Cutler et al. | |
| 2020/0163818 | A1 | 5/2020 | Theunick et al. | |
| 2021/0177679 | A1 | 6/2021 | St. John et al. | |

OTHER PUBLICATIONS

Koninklijke Philips Electronics N.V., “IntelliVue MP40/MP50 Patient Monitor Brochure”, 2012, 16 pages.

Stryker, “Altrix Precision Temerature Management System Brochure”, 2016, 6 pages.

Welch Allyn, “Surveyor Central Bedside and Telemetry Patient Monitoring Spe Brochure”, 2018, 2 pages.

Hill-Rom, “Progressa Bed User Manual—Product No. 7500”, 171528 Rev 1, 2013, 106 pages.

English language abstract and machine-assisted English translation for JP 2009-115298 A extracted from espacenet. com and Google Patent databases on Dec. 15, 2025, 10 pages.

User Manual Progressa™ Bed From Hill-Rom Product No. P7500: 171528 Rev 1, published by Hill-Rom Services, Inc. in Jul. 2013.†

* cited by examiner
† cited by third party

PATIENT SUPPORT APPARATUS FOR SENSING AND RESPONDING TO AN EMERGENCY EVENT

CROSS-REFERENCE TO RELATED APPLICATIONS

The subject patent application claims priority to and all the benefits of U.S. Provisional Patent Application No. 63/030,585, filed on May 27, 2020, the entire contents and disclosure of which is hereby incorporated by reference in its entirety.

BACKGROUND

Often, a patient support apparatus (such as a hospital bed or stretcher) has a patient support deck with a raiseable back section. An emergency CPR release lever can be provided that, when pulled, causes the back section to automatically lower to a suitable position for performing cardiopulmonary resuscitation (CPR) on a patient. Sometimes, even with the back section lowered, the patient support apparatus remains in a configuration that makes performing CPR more challenging. As a result, a caregiver may wish to further move the patient support deck before performing CPR. However, motion locks may be active that prevent movement of the patient support deck.

SUMMARY

The present disclosure provides a patient support apparatus for sensing and responding to an emergency event. The patient support apparatus includes a support structure having a support frame and a patient support deck with a deck section capable of articulation relative to the support frame. A plurality of actuators are coupled to the support structure, including a lift actuator to lift and lower the patient support deck relative to a floor surface and a deck actuator to articulate the deck section relative to the support frame. A user interface is provided to cause operation of the plurality of actuators. An activator is coupled to the support structure and is arranged to be actuated by a user to signal the emergency event. A controller is coupled to the activator, the user interface, and the plurality of actuators. The controller includes a motion lock module having a plurality of configurable electronic motion locks including a first motion lock associated with the lift actuator and a second motion lock associated with the deck actuator. The first motion lock has a lift locked state in which the user interface is inoperable to actuate the lift actuator, and a lift unlocked state in which the user interface is operable to actuate the lift actuator. The second motion lock has a deck locked state in which the user interface is inoperable to actuate the deck actuator, and a deck unlocked state in which the user interface is operable to actuate the deck actuator. The controller is configured to automatically reset the first motion lock and the second motion lock to their unlocked states in response to detecting the emergency event.

The present disclosure also provides a method for sensing and responding to an emergency event on a patient support apparatus, the patient support apparatus including a support structure having a support frame and a patient support deck with a deck section capable of articulation relative to the support frame, a lift actuator to lift and lower the patient support deck relative to a floor surface, a deck actuator to articulate the deck section relative to the support frame, a user interface, and an activator coupled to the support structure to be actuated by a user to signal the emergency event, the method including: storing settings for a plurality of configurable electronic motion locks including a first motion lock associated with the lift actuator and a second motion lock associated with the deck actuator, wherein the first motion lock has a lift locked state in which the user interface is inoperable to actuate the lift actuator and a lift unlocked state in which the user interface is operable to actuate the lift actuator and the second motion lock has a deck locked state in which the user interface is inoperable to actuate the deck actuator and a deck unlocked state in which the user interface is operable to actuate the deck actuator; detecting the emergency event; and automatically resetting the first and second motion locks to their unlocked states in response to detecting the emergency event.

The present disclosure also provides a system for sensing and responding to an emergency event, the system including an activator to signal the emergency event and a patient support apparatus. The patient support apparatus includes a support structure having a support frame and a patient support deck with a deck section capable of articulation relative to the support frame. A plurality of actuators are coupled to the support structure, including a lift actuator to lift and lower the patient support deck relative to a floor surface and a deck actuator to articulate the deck section relative to the support frame. A user interface is provided to cause operation of the plurality of actuators. A controller is coupled to the activator, the user interface, and the plurality of actuators. The controller is configured to detect the emergency event and includes a motion lock module having a plurality of configurable electronic motion locks including a first motion lock associated with the lift actuator and a second motion lock associated with the deck actuator. The first motion lock has a lift locked state in which the user interface is inoperable to actuate the lift actuator, and a lift unlocked state in which the user interface is operable to actuate the lift actuator. The second motion lock has a deck locked state in which the user interface is inoperable to actuate the deck actuator, and a deck unlocked state in which the user interface is operable to actuate the deck actuator. The controller is configured to automatically reset the first motion lock and the second motion lock to their unlocked states in response to detecting the emergency event.

DETAILED DESCRIPTION

Figure 1:
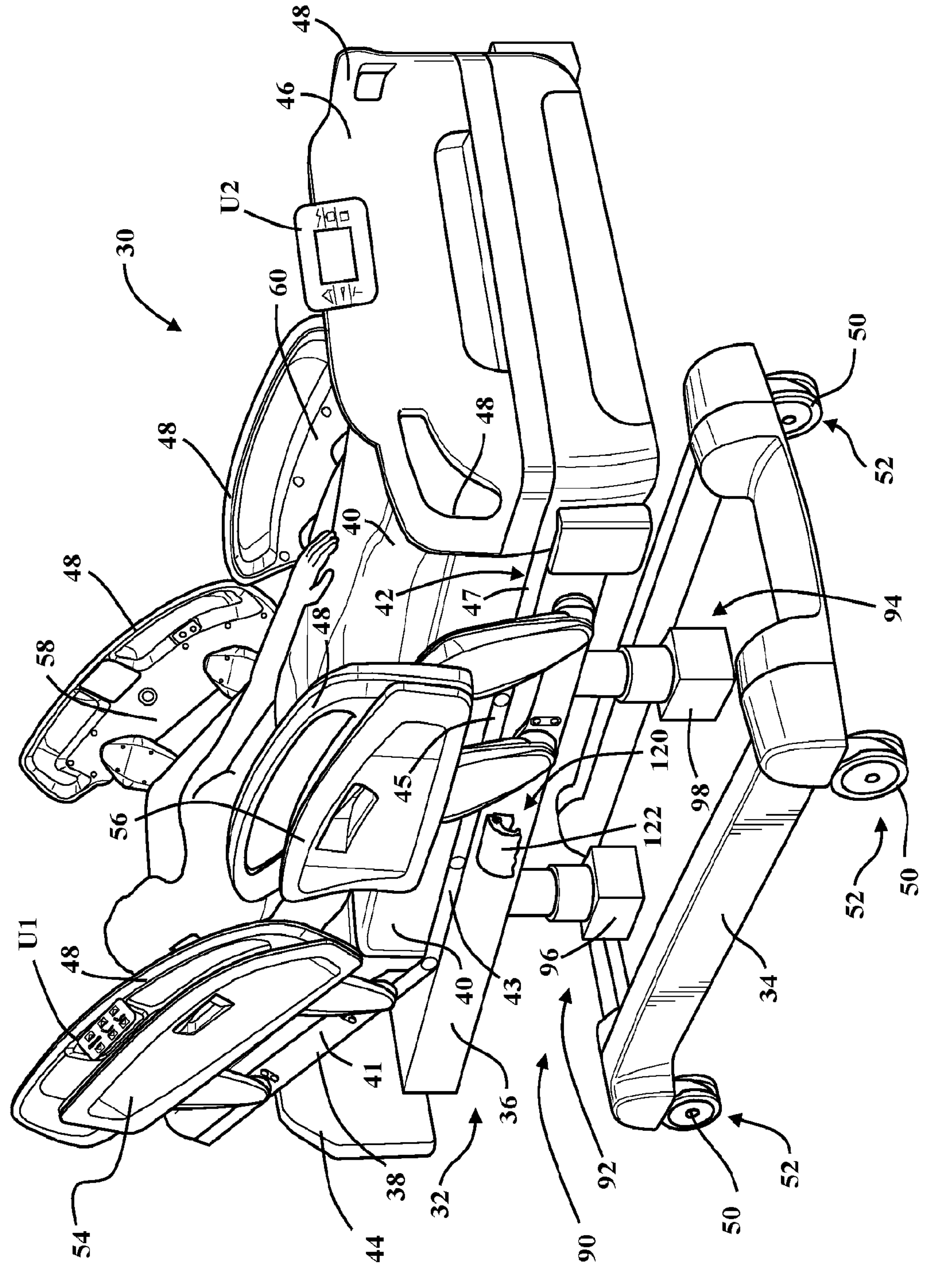
FIG. 1 is a perspective view of a patient support apparatus including an activator for signaling an emergency event.

Referring to FIG. 1, a patient support apparatus 30 is shown for supporting a patient in a health care setting. The patient support apparatus 30 illustrated in FIG. 1 is a hospital bed. In some versions, however, the patient support apparatus 30 may be a stretcher, cot, table, wheelchair, or similar apparatus utilized in the care of a patient.

A support structure 32 provides support for the patient. The support structure 32 illustrated in FIG. 1 includes a base 34 and a support frame 36. The support frame 36 is shown above the base 34. The support structure 32 also includes a patient support deck 38 disposed on the support frame 36. The patient support deck 38 includes several deck sections, some of which articulate (e.g., pivot) relative to the support frame 36, such as a back section 41 (also referred to as a fowler section), a seat section 43, a thigh section 45, and a foot section 47. More or fewer deck sections may be present in some versions. The patient support deck 38 provides a patient support surface 42 upon which the patient is supported. Collectively, the support frame 36 and the patient support deck 38 form a litter of the patient support apparatus 30.

A mattress 40 is disposed on the patient support deck 38. The mattress 40 includes a secondary patient support surface upon which the patient is supported. The base 34, support frame 36, patient support deck 38, and patient support surfaces 42 each have a head end and a foot end corresponding to designated placement of the patient's head and feet on the patient support apparatus 30. The construction of the support structure 32 may take on any known or conventional design, and is not limited to that specifically set forth above. In addition, the mattress 40 may be omitted in certain versions, such that the patient rests directly on the patient support surface 42.

A headboard 44 and a footboard 46 are coupled to the support frame 36. In some versions, when the headboard 44 and footboard 46 are included, the headboard 44 and footboard 46 may be coupled to other locations on the patient support apparatus 30, such as the base 34. In still further versions, the patient support apparatus 30 does not include the headboard 44 and/or the footboard 46.

Caregiver interfaces 48, such as handles, are shown integrated into the footboard 46 to facilitate movement of the patient support apparatus 30 over floor surfaces. Additional caregiver interfaces 48 may be integrated into the headboard 44 and/or other components of the patient support apparatus 30. The caregiver interfaces 48 are graspable by the caregiver to manipulate the patient support apparatus 30 for movement.

Wheels 50 are coupled to the base 34 to facilitate transport over the floor surfaces. The wheels 50 are arranged in each of four quadrants of the base 34 adjacent to corners of the base 34. In the version shown, the wheels 50 are caster wheels able to rotate and swivel relative to the support structure 32 during transport. Each of the wheels 50 forms part of a caster assembly 52. Each caster assembly 52 is mounted to the base 34. It should be understood that various configurations of the caster assemblies 52 are contemplated. In addition, in some versions, the wheels 50 are not caster wheels and may be non-steerable, steerable, non-powered, powered, or combinations thereof. Additional wheels are also contemplated. For example, the patient support apparatus 30 may include four non-powered, non-steerable wheels, along with one or more powered wheels. In some cases, the patient support apparatus 30 may not include any wheels.

Side rails 54, 56, 58, 60 are coupled to the support structure 32, such as by being coupled directly to the support frame 36 and/or the patient support deck 38. The side rails 54, 56, 58, 60 are thus indirectly supported by the base 34. A first side rail 54 is positioned at a right head end of the patient support apparatus 30. The first side rail 54 is coupled to the back section 41 of the patient support deck 38. A second side rail 56 is positioned at a right foot end of patient support apparatus 30. The second side rail 56 is coupled to the support frame 36. A third side rail 58 is positioned at a left head end of the patient support apparatus 30. The third side rail 58 is coupled to the back section 41 of the patient support deck 38. A fourth side rail 60 is positioned at a left foot end of the patient support apparatus 30. The fourth side rail 60 is coupled to the support frame 36.

It should be appreciated that the side rails 54, 56, 58, 60 may be mounted to other parts of the patient support apparatus 30. In some cases, all of the side rails 54, 56, 58, 60 are mounted to the support frame 36. In other cases, all of the side rails 54, 56, 58, 60 are mounted to the patient support deck 38. If the patient support apparatus 30 is a stretcher or a cot, there may be fewer side rails.

Figure 2:
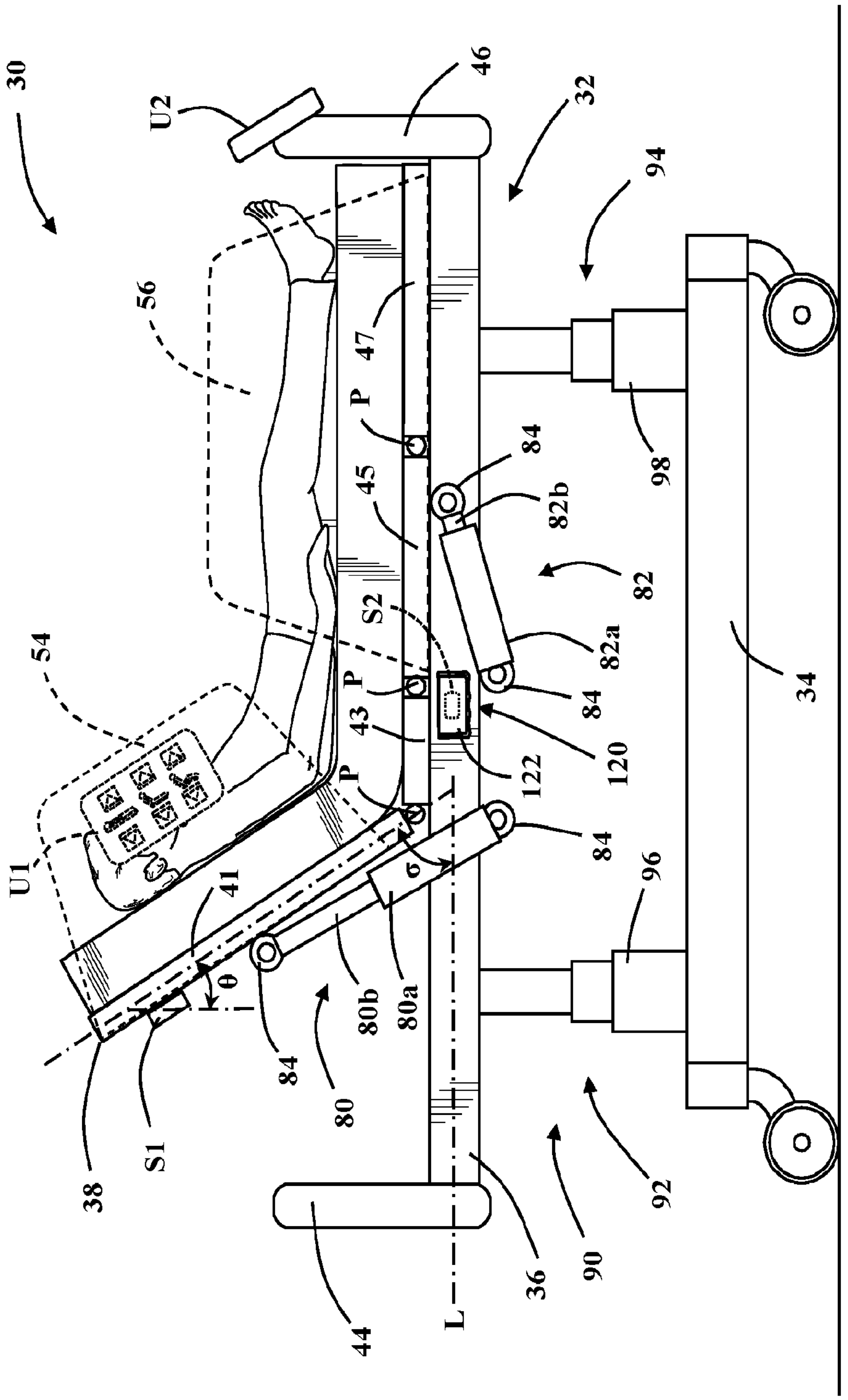
FIG. 2 is a side elevational and schematic view of the patient support apparatus.

Referring to FIG. 2, the side rails 54, 56 are shown schematically and in phantom to better illustrate the deck sections 41, 43, 45, 47. The deck sections 41, 43, 45, 47 are shown in a configuration in which the back section 41 is raised above the support frame 36 and the seat section 43 is fixed to the support frame 36 (such as by welding, fasteners, or the like). The thigh section 45 and the foot section 47 are capable of articulating relative to the support frame 36.

In the version shown, the deck sections 41, 43, 45, 47 are pivotally coupled together in series at pivot joints defined about pivot axes P. Each of the deck sections 41, 43, 45, 47 has a first end and a second end. The first end is closer to the head end of the patient support apparatus 30 when the patient support deck 38 is in a flat configuration and the second end is closer to the foot end of the patient support apparatus 30. In the version shown, the second end of the back section 41 is pivotally coupled to the first end of the seat section 43 about one of the pivot axes P. The first end of the thigh section 45 is pivotally coupled to the second end of the seat section 43 about another of the pivot axes P. The first end of the foot section 47 is pivotally coupled to the second end of the thigh section 45 about another of the pivot axes P (see also FIG. 4C).

The deck sections 41, 43, 45, 47 may be pivotally coupled together by pivot pins, shafts, and the like at the pivot joints. Pivot brackets may be employed to form the pivot joints. Additionally, other types of connections are possible between the deck sections 41, 43, 45, 47 so that the deck sections 41, 43, 45, 47 are capable of moving, e.g., articulating, relative to one another. For instance, in some cases, translational joints may be provided between adjacent deck sections, or other compound movement connections may be provided between adjacent deck sections, such as joints that allow both pivotal and translational motion between adjacent deck sections. Further, in some cases, the back section 41 and the thigh section 45 may be pivotally (or otherwise) connected directly to the support frame 36 or other part of the support structure 32, instead of the seat section 43. See, for example, the back section shown in U.S. Patent Application Pub. No. 2020/0107983, entitled "Patient Support Apparatus With Articulating Fowler Deck Section Traveling Through Arcuate Path," filed on Oct. 8, 2019, hereby incorporated herein by reference.

The deck sections 41, 43, 45, 47 may comprise frames and deck panels removably coupled to the frames. The deck sections 41, 43, 45, 47 may comprise only frames or only deck panels, or may have any suitable configuration. The deck panels may be plastic panels that snap fit or are otherwise capable of being easily removed from their frames for cleaning, etc. The deck panels could also be formed of other materials and may be permanently affixed to the frames. Each of the deck sections may comprise structural members (e.g., metal bars and tubes) welded together to form a support framework over which deck panels are attached. The deck sections could also be formed of other materials and comprise only single members, such as a single panel, frame, or other type of support structure.

Deck actuators 80, 82 operate to move the back section 41, thigh section 45, and foot section 47 relative to each other and the support frame 36. The deck actuators 80, 82 may be linear actuators, rotary actuators, or other type of actuators capable of moving the back section 41, thigh section 45, and foot section 47. The deck actuators 80, 82 may be electrically powered, hydraulic, electro-hydraulic, and/or pneumatic, or the like. The deck actuators 80, 82 may include motors, gear trains, drive screws, nuts/lead screws, and the like, for actuation. In the version shown, the deck actuators 80, 82 are electrically powered linear actuators including actuator housings 80*a*, 82*a* and drive rods 80*b*, 82*b* that extend and retract with respect to their associated actuator housing 80*a*, 82*a* (compare FIGS. 2 and 4B and movement of drive rod 80*b*). Hereinafter, the deck actuators 80, 82 shall be referred to as a back section actuator 80 and a thigh section actuator 82.

The back section actuator 80 is operatively connected to the back section 41 to pivot, or otherwise articulate, the back section 41 relative to the support frame 36 between a lowered position and one or more raised positions. More specifically, the back section actuator 80 pivots the back section 41 about its pivot axis P relative to the seat section 43. In the version shown, the back section actuator 80 is pivotally connected at a first actuator end to a mounting bracket 84 fixed to the support frame 36 (e.g., welded, fastened, integral therewith, etc.). The back section actuator 80 is pivotally connected at a second actuator end to a mounting bracket fixed to the back section 41 (e.g., welded, fastened, integral therewith, etc.). The back section actuator 80 could be pivotally connected to these brackets via pivot pins, shafts, and the like. In other versions, the back section actuator 80 may be connected through other types of connections or linkages in order to move the back section 41 to the lowered position or the one or more raised positions. See, for example, the back section actuator shown in U.S. Patent Application Pub. No. 2020/0107983, entitled "Patient Support Apparatus With Articulating Fowler Deck Section Traveling Through Arcuate Path," filed on Oct. 8, 2019, incorporated herein by reference.

The thigh section actuator 82 is operatively connected to the thigh section 45 to pivot, or otherwise articulate, the thigh section 45 relative to the support frame 36 between a lowered position and one or more raised positions. More specifically, the thigh section actuator 82 pivots the thigh section 45 about its pivot axis P relative to the seat section 43. Owing to the pivotal coupling of the second end of the thigh section 45 to the first end of the foot section 47, when the thigh section 45 is moved, the first end of the foot section 47 is also moved. The second end of the foot section 47 may be a free end that slides along the support frame 36 when the thigh section 45 is being moved. The second end of the foot section 47 may be connected in other ways to the support frame 36. In the version shown, the thigh section actuator 82 is pivotally connected at a first actuator end to a mounting bracket 84 fixed to the support frame 36 (e.g., welded, fastened, integral therewith, etc.). The thigh section actuator 82 is pivotally connected at a second actuator end to a mounting bracket 84 fixed to the thigh section 45 (e.g., welded, fastened, integral therewith, etc.). The thigh section actuator 82 could be pivotally connected to these brackets via pivot pins, shafts, and the like. In other versions, the thigh section actuator 82 may be connected through other types of connections or linkages in order to move the thigh section 45 to the lowered position or the one or more raised positions. The deck actuators 80, 82 are operable to move the patient support deck 38 to different configurations.

An angle sensor S1 may be operatively coupled to the back section 41 to measure a current angle σ of the back section 41 relative to a longitudinal axis L. The longitudinal axis L may be an axis that remains parallel to the floor surface or a horizontal axis defined perpendicular to a gravity vector. The longitudinal axis L may also be defined by the support frame 36 and may move with the support frame 36. In this case, when the support frame 36 tilts from horizontal, such as when moving to a Trendelenburg position, the current angle σ may be corrected by a separate sensor on the patient support apparatus 30 that measures a Trendelenburg tilt angle to determine the angle of the back section 41 relative to horizontal. The angle sensor S1 may also measure an angle θ of the back section 41 relative to gravity to determine the current angle σ relative to horizontal. The angle sensor S1 may include one or more accelerometers, tilt sensors, gyroscopes, potentiometers, hall-effect sensors, or the like. The angle sensor S1 may also be placed at the pivot axis P for the back section 41 to measure the current angle σ. Any suitable angle sensor and/or location may be employed to measure the current angle σ of the back section 41.

The patient support apparatus 30 includes a lift system 90 that operates to lift and lower the support frame 36 and the patient support deck 38 relative to the base 34. The lift system 90 is configured to move the support frame 36 from a high height position (shown in FIG. 2) to a low height position (see FIG. 4C), or to any desired position in between. The lift system 90 includes a head end lift 92 and a foot end lift 94. The head end lift 92 is arranged to lift or lower the head end of the support frame 36 relative to the base 34. The foot end lift 94 is arranged to lift or lower the foot end of the support frame 36 relative to the base 34. Each of the head end lift 92 and the foot end lift 94 includes a lift actuator 96, 98 to actuate the lifts 92, 94.

In the version shown, the lifts 92, 94 are column lifts that extend and retract vertically in a telescoping manner. The column lifts may be hydraulic jacks capable of extending and retracting. The column lifts may be like those described in U.S. Pat. No. 6,820,294, entitled "Linkage For Lift/Lowering Control For A Patient Supporting Platform," filed on Feb. 26, 2002, hereby incorporated herein by reference, or like those described in U.S. Pat. No. 7,395,564, entitled "Articulated Support Surface For A Stretcher Or Gurney," filed on Mar. 24, 2006, hereby incorporated herein by reference. The lifts 92, 94 may be identical in form or may have different forms. For instance, one of the lifts may be a crank-type mechanism or scissor-type mechanism, while the other of the lifts may be a column lift.

Another lift system that can be used on the patient support apparatus 30 is shown in U.S. Provisional Patent Application No. 62/948,540, filed on Dec. 16, 2019, entitled "Patient Support With Lift Assembly," which is hereby incorporated herein by reference.

The lift actuators 96, 98 include linear actuators, rotary actuators, or other types of actuators. The lift actuators 96, 98 may be electrically operated, hydraulic, electro-hydraulic, and/or pneumatic, or the like. The lift actuators 96, 98 may include motors, gear trains, drive screws, nuts/lead screws, and the like, for actuation. In the version shown, the lift actuators 96, 98 are electrically powered linear actuators.

Figure 3:
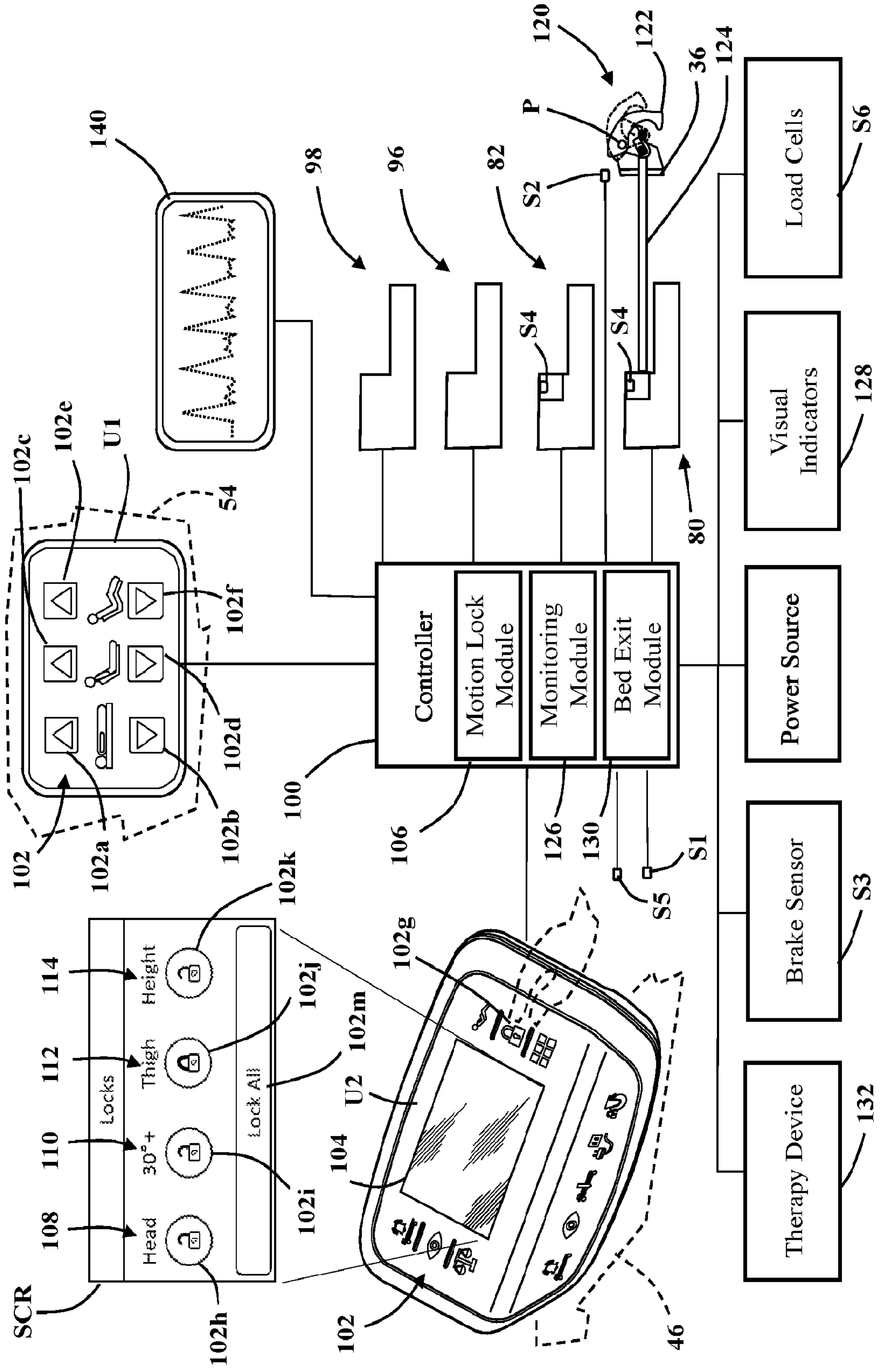
FIG. 3 is a block diagram of a control system for the patient support apparatus.

Referring to FIG. 3, a control system is shown to control operation of the actuators 80, 82, 96, 98. The control system includes a controller 100 having one or more processors for processing instructions or for processing algorithms stored in memory of the controller 100 to control operation of the actuators 80, 82, 96, 98, to coordinate movement of the actuators 80, 82, 96, 98, or to independently operate the actuators 80, 82, 96, 98 to place the patient support deck 38 in various configurations. Additionally or alternatively, the controller 100 may include one or more microcontrollers, microprocessors, field programmable gate arrays, systems on a chip, discrete circuitry, and/or other suitable hardware, software, or firmware that is capable of carrying out the functions described herein. The controller 100 may be carried on-board the patient support apparatus 30 or may be remotely located. In some versions, the controller 100 is mounted to the base 34. In some versions, the controller 100 is mounted to the footboard 46. Power to the actuators 80, 82, 96, 98 and/or the controller 100 may be provided by a battery power source and/or an external power source.

The controller 100 is coupled to the actuators 80, 82, 96, 98 in a manner that allows the controller 100 to control the actuators 80, 82, 96, 98. The controller 100 may communicate with the actuators 80, 82, 96, 98 via wired or wireless connections to perform one of more desired functions. The controller 100 may monitor a current state of the actuators 80, 82, 96, 98 via one or more sensors and determine desired states in which the actuators 80, 82, 96, 98 should be placed, based on one or more input signals that the controller 100 receives from one or more user input devices. The state of the actuators 80, 82, 96, 98 may be a position, a relative position, an angle, an energization status (e.g., on/off), or any other parameter of the actuators 80, 82, 96, 98.

One or more user interfaces may be provided to allow a user, such as a caregiver, to control movement of the patient support deck 38 to various configurations. A first user interface U1 is shown mounted to one of the side rails 54, 56, 58, 60. The first user interface U1 may also be a pendant-type user interface or embodied in a portable electronic device (e.g., iWatch®, iPhone®, iPad®, or similar electronic devices). A similar user interface U1 could be mounted to all of the side rails 54, 56, 58, 60, only to side rails 54, 58, or to any one or more of the side rails 54, 56, 58, 60.

The first user interface U1 is coupled to the controller 100. The first user interface U1 has one or more user input devices 102 (also referred to as controls), which transmit corresponding input signals to the controller 100, and the controller 100 controls operation of the actuators 80, 82, 96, 98 based on the input signals. The user input devices 102 may include any device capable of being actuated by the user and may be provided on a control panel, touchscreen, or the like. The user input devices 102 may be configured to be actuated in a variety of different ways, including but not limited to, mechanical actuation (hand, foot, finger, etc.), hands-free actuation (voice, foot, etc.), and the like. The user input devices 102 may include buttons, a gesture sensing device for monitoring motion of hands, feet, or other body parts of the user (such as through a camera), a microphone for receiving voice activation commands, a foot pedal, and sensors (e.g., infrared sensor such as a light bar or light beam to sense a user's body part, ultrasonic sensors, capacitive sensors, etc.). Additionally, the buttons/pedals can be physical buttons/pedals, such as pushbuttons, or virtually implemented buttons/pedals such as through optical projection or on a touchscreen. The buttons/pedals may also be mechanically connected or drive-by-wire type buttons/pedals where a user applied force actuates a sensor, such as a switch or potentiometer. It should be appreciated that any combination of user input devices may also be utilized. In the version shown in FIG. 3, the user input devices 102 on the first user interface U1 include buttons, such as buttons 102*a*, 102*b* corresponding to lifting/lowering the patient support deck 38, buttons 102*c*, 102*d* corresponding to raising/lowering the back section 41, and buttons 102*e*, 102*f* corresponding to raising/lowering the thigh section 45.

During operation, when a user wishes to move the patient support deck 38 into a different configuration, the user actuates one or more of the user input devices 102. For instance, in the event the user wishes to lower the patient support deck 38 relative to the base 34, the user actuates the appropriate user input device 102 (see button 102*b*, for example). In response to actuation, the controller 100 sends output signals to the lift actuators 96, 98 to cause simultaneous operation of the actuators 96, 98 in a manner that causes the patient support deck 38 to lower relative to the floor surface. As another example, in the event the user wishes to move the back section 41 to its lowered position relative to the support frame 36, the user actuates the appropriate user input device 102 (see button 102*d*, for example). In response to actuation, the controller 100 sends an output signal to the back section actuator 80 to cause operation of the back section actuator 80 in a manner that causes the back section 41 to move toward its lowered position.

A second user interface U2 is shown mounted to the footboard 46. The second user interface U2 could also be mounted to the headboard 44 or may be a pendant-type user interface or embodied in a portable electronic device (e.g., iWatch®, iPhone®, iPad®, or similar electronic devices). The second user interface U2 is coupled to the controller 100. The second user interface U2, like the first user interface U1, has one or more user input devices 102, which transmit corresponding input signals to the controller 100. The second user interface U2 includes the functionality of the first user interface U1 but also has additional functionality as described further below. In the version shown in FIG. 3, the user input devices 102 on the second user interface U2 include buttons disposed about a display 104 that activate sensors (e.g., switches) coupled to the controller 100, as well as a capacitive touchscreen integrated with the display 104. The touchscreen provides buttons (virtual) for actuation by the user in one or more user menus. The display 104 may be an LCD, LED, OLED, or similar type of electronic display.

One of the buttons disposed about the display 104 of the second user interface U2, is a lock button 102*g* represented by a lock symbol. When actuated, a sensor (e.g., a switch) associated with the lock button 102*g* transmits an input signal to the controller 100 that causes the controller 100 to access a motion lock module 106 and output lock menu screen SCR on the display 104. The motion lock module 106 forms part of a software program operable by the controller 100 and includes executable code to be executed by one or more processors of the controller 100. The motion lock module 106 allows the user to limit (or lock out) operation of certain features of the patient support apparatus 30, to prevent the patient or others from operating such features.

Buttons 102*h*, 102*i*, 102*j*, 102*k* (e.g., virtual touchscreen buttons) provided on the lock menu screen SCR are associated with a plurality of configurable, electronic motion locks 108, 110, 112, 114 that are configurable by the user between locked and unlocked states. The motion locks 108, 110, 112, 114 are associated with the deck actuators 80, 82 and the lift actuators 96, 98 to control operation of these actuators 80, 82, 96, 98, e.g., to selectively lock or unlock motion caused by these actuators 80, 82, 96, 98. In the version shown, there are four motion locks 108, 110, 112, 114 that can be configured by the user, including a head motion lock 108, a 30-degree fowler lock 110, a thigh motion lock 112, and a height lock 114. The motion locks 108, 110, 112, 114 may be toggled between their locked and unlocked states via the buttons 102*h*, 102*i*, 102*j*, 102*k* (or via any other suitable user input device). Each of these motion locks 108, 110, 112, 114 is electrically coupled to the controller 100 and sends a corresponding signal to the controller 100 to toggle to the locked state or the unlocked state when their associated user input devices (e.g., buttons) are actuated (e.g., touched, depressed, etc.). The controller 100 stores the current state of each of the motion locks 108, 110, 112, 114 in its memory and controls the actuators 80, 82, 96, 98 accordingly. In FIG. 3, a virtual lock symbol generated by the controller 100 and shown on the display 104 shows the current state of the motion locks 108, 110, 112, 114 (three are shown in the unlocked state and one is shown in the locked state in FIG. 3). It should be appreciated that there may be more or fewer motion locks in some versions.

When the head motion lock 108 is in its locked state (also referred to as a deck locked state), the first user interface U1 and/or the second user interface U2 are inoperable to actuate the back section actuator 80 to raise or lower the back section 41. When the head motion lock 108 is in its unlocked state (also referred to as a deck unlocked state), the first user interface U1 and/or the second user interface U2 are operable to actuate the back section actuator 80 to raise or lower the back section 41. When the head motion lock 108 is toggled from the unlocked state to the locked state via the button 102*h*, the controller 100 sets the current state for the head motion lock 108 in its memory to the locked state. Thereafter, until the head motion lock 108 is toggled back to the unlocked state, the controller 100 limits actuation of the back section actuator 80, e.g., so that the back section actuator 80 will not function when the associated user input devices (e.g., buttons 102*c*, 102*d*) on the first user interface U1 and/or the second user interface U2 are actuated (e.g., touched, depressed, etc.).

When the 30-degree fowler lock 110 is in its locked state, the first user interface U1 and/or the second user interface U2 are inoperable to actuate the back section actuator 80 in a manner that lowers the back section 41 below an angle σ of 30 degrees. When the 30-degree fowler lock 110 is in its unlocked state, the first user interface U1 and/or the second user interface U2 are operable to actuate the back section actuator 80 to lower the back section 41 below an angle σ of 30 degrees. When the 30-degree fowler lock 110 is toggled from the unlocked state to the locked state via the button 102*i*, the controller 100 sets the current state for the 30-degree fowler lock 110 in its memory to the locked state. Thereafter, until the 30-degree fowler lock 110 is toggled back to the unlocked state, the controller 100 limits actuation of the back section actuator 80, e.g., so that the back section actuator 80 will not function in a manner that lowers the back section 41 below an angle σ of 30 degrees.

When the thigh motion lock 112 is in its locked state (also referred to as a deck locked state), the first user interface U1 and/or the second user interface U2 are inoperable to actuate the thigh section actuator 82 to raise or lower the thigh section 45. When the thigh motion lock 112 is in its unlocked state (also referred to as a deck unlocked state), the first user interface U1 and/or the second user interface U2 are operable to actuate the thigh section actuator 82 to raise or lower the thigh section 45. When the thigh motion lock 112 is toggled from the unlocked state to the locked state via the button 102*j*, the controller 100 sets the current state for the thigh motion lock 112 in its memory to the locked state. Thereafter, until the thigh motion lock 112 is toggled back to the unlocked state, the controller 100 limits actuation of the thigh section actuator 82, e.g., so that the thigh section actuator 82 will not function when the associated user input devices (e.g., buttons 102*e*, 1020 on the first user interface UI and/or the second user interface U2 are actuated (e.g., touched, depressed, etc.).

When the height lock 114 is in its locked state (also referred to as a lift locked state), the first user interface U1 and/or the second user interface U2 are inoperable to actuate the lift actuators 96, 98 to lift or lower the support frame 36 and the patient support deck 38. When the height lock 114 is in its unlocked state (also referred to as a lift unlocked state), the first user interface U1 and/or the second user interface U2 are operable to actuate the lift actuators 96, 98 to lift or lower the support frame 36 and the patient support deck 38. When the height lock 114 is toggled from the unlocked state to the locked state via the button 102*k*, the controller 100 sets the current state for the height lock 114 in its memory to the locked state. Thereafter, until the height lock 114 is toggled back to the unlocked state, the controller 100 limits actuation of the lift actuators 96, 98, e.g., so the lift actuators 96, 98 will not function when the associated user input devices (e.g., buttons 102*a*, 102*b*) on the first user interface UI are actuated.

Another button 102*m* can be actuated by the user to cause two or more of the motion locks 108, 110, 112, 114 to be toggled to the locked state simultaneously. In the version shown, if all of the motion locks 108, 110, 112, 114 are currently in their unlocked state and the button 102*m* is actuated (e.g., touched, depressed, etc.), then the motion locks 108, 112, 114 are toggled to the locked state. The 30-degree fowler lock 110 remains in the unlocked state. Examples of motion locks and their control to lockout motion of actuators are described in U.S. Patent Application Pub. No. 2015/0000035, entitled "Patient Handling Device Including Local Status Indication, One-Touch Fowler Angle Adjustment, And Power-On Alarm Configuration," filed on Sep. 17, 2014, which is hereby incorporated herein by reference.

Figure 4A:
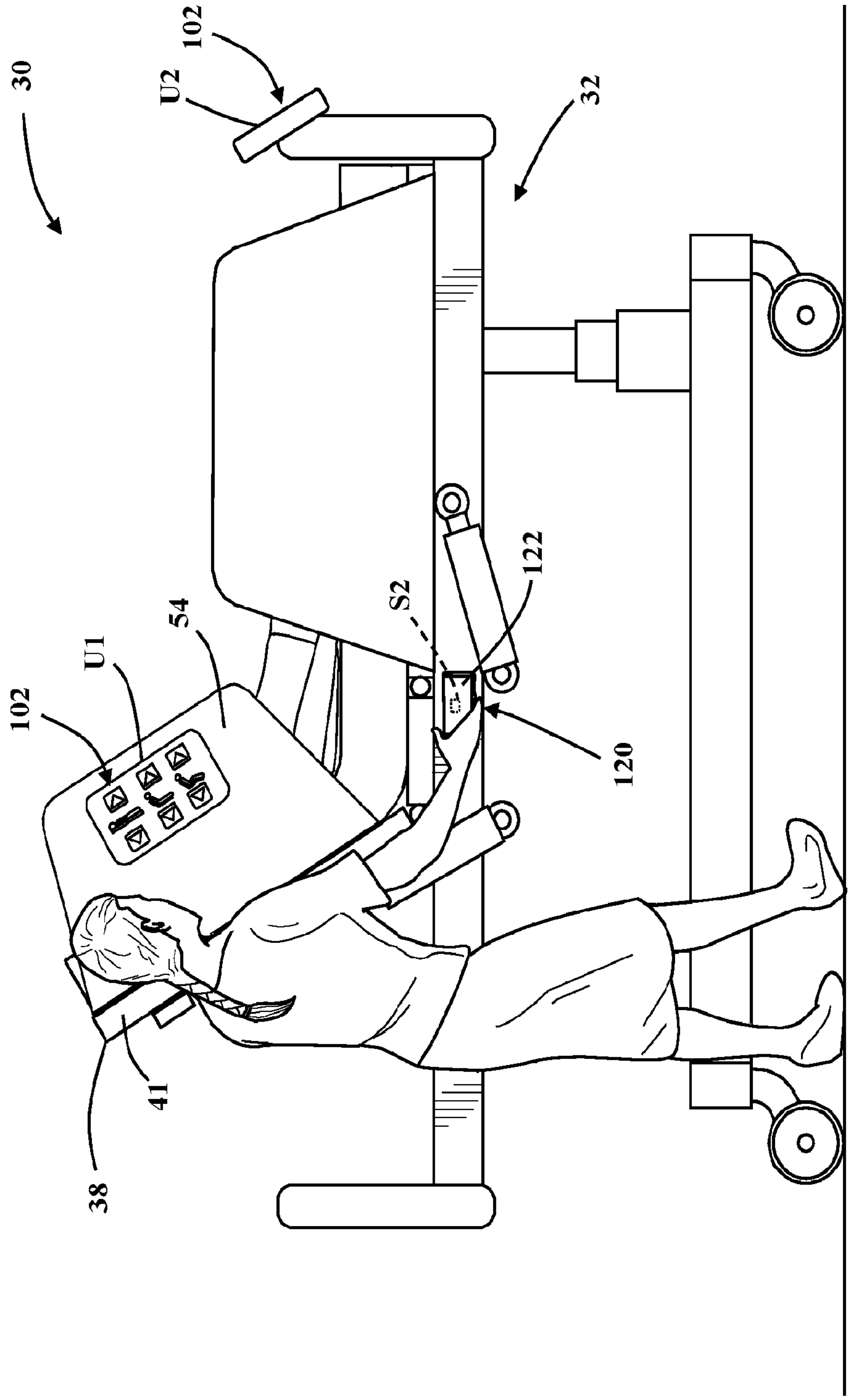
FIG. 4A illustrates a user actuating the activator to signal the emergency event.

Referring to FIGS. 3 and 4A, in situations where the patient requires emergency care (e.g., CPR) it may be desirable for the user to be able to quickly cause movement of the patient support deck 38 to a different configuration than its current configuration. However, the motion lock module 106 and associated user input devices 102 that allow setting (e.g., unlocking) of the motion locks 108, 110, 112, 114 may only be available on the second user interface U2 at the foot end of the patient support apparatus 30. Thus, if the user is already attending to the patient on a side of the patient support apparatus 30, as shown in FIG. 4A, the user may be unable to quickly/easily access the second user interface U2 at the foot end in order to reset all the motion locks 108, 110, 112, 114 to their unlocked states. As a result, an activator 120 is provided on the patient support apparatus 30 to signal an emergency event, and to cause the controller 100 to automatically reset all of the motion locks 108, 110, 112, 114 to their unlocked states so that the user can reconfigure the patient support deck 38 via the user input devices 102 on the first user interface U1 provided on the side rail 54 (or other side rails). The activator 120, when actuated by the user, effectively signals to the controller 100 to perform certain actions in preparation or anticipation of emergency care being performed, such as CPR. The user may actuate the activator 120 to signal that any form of emergency is occurring that requires immediate reconfiguration of the patient support apparatus 30.

The activator 120 is coupled to the support structure 32 and to the controller 100 (see FIG. 3) and is arranged to be actuated by a user to signal the emergency event. The activator 120 may be coupled to the base 34, the support frame 36, the patient support deck 38, or at any other suitable location. In the version shown in FIGS. 3 and 4A, the activator 120 includes a manual lever 122 and a sensor S2 arranged to sense actuation of the manual lever 122. The manual lever 122 is shaped to be grasped and pulled by the user's hand to pivot the manual lever 122 about a pivot axis P (see FIG. 3) fixed relative to the support frame 36, but other forms of levers are also contemplated, such as foot pedals, and the like. The sensor S2 is coupled to the controller 100 to transmit an input signal to the controller 100 indicating the emergency event so that the controller 100 detects when the emergency event has started. The sensor S2 may be an accelerometer, gyroscope, limit switch, potentiometer, hall-effect sensor, motion sensor, other switch types, or any other suitable sensor for sensing actuation (e.g. movement) of the manual lever 122. The sensor S2, for example, may be a potentiometer disposed at the pivot axis P, a hall-effect sensor to measure movement of the manual lever 122 via a magnet mounted to the manual lever 122, an accelerometer attached to the manual lever 122, a limit switch engaged when the manual lever 122 is in its normal, unactuated position, and disengaged when the manual lever 122 is actuated, or the like. In some versions, the activator 120 includes any user input device as previously described.

The manual lever 122, in some versions, is operatively coupled to the back section actuator 80 and operable to cause the back section 41 to automatically articulate to its lowered position. For instance, the manual lever 122 may be mechanically connected to the back section actuator 80 via a mechanical linkage 124, such as a Bowden cable (see FIG. 3), to engage components in the back section actuator 80 (e.g., to disengage a motor, allow back driving of a motor, release a brake, etc.) which allows the back section 41 to lower under the weight of the patient acting on the back section 41. Such a mechanical linkage between a manual lever and a back section actuator is disclosed, for example, in U.S. Pat. No. 7,836,531, entitled "CPR Drop Mechanism For A Hospital Bed," filed Aug. 1, 2008, hereby incorporated herein by reference.

In some versions, the controller 100 is configured to automatically operate one or more of the deck actuators 80, 82 to articulate one or more of the deck sections 41, 43, 45, 47 to a lowered position in response to detecting the emergency event. For example, in versions without any mechanical linkage that allows the back section 41 to lower under the patient's weight, the controller 100 may instead automatically operate the back section actuator 80 to lower the back section 41 to its lowered position. The controller 100 may also be configured to automatically operate one or more of the lift actuators 96, 98 to lower the patient support deck 38 to the low height position in response to detecting the emergency event and to automatically operate a mattress inflation system to deflate the mattress 40 in response to detecting the emergency event.

Figure 4B:
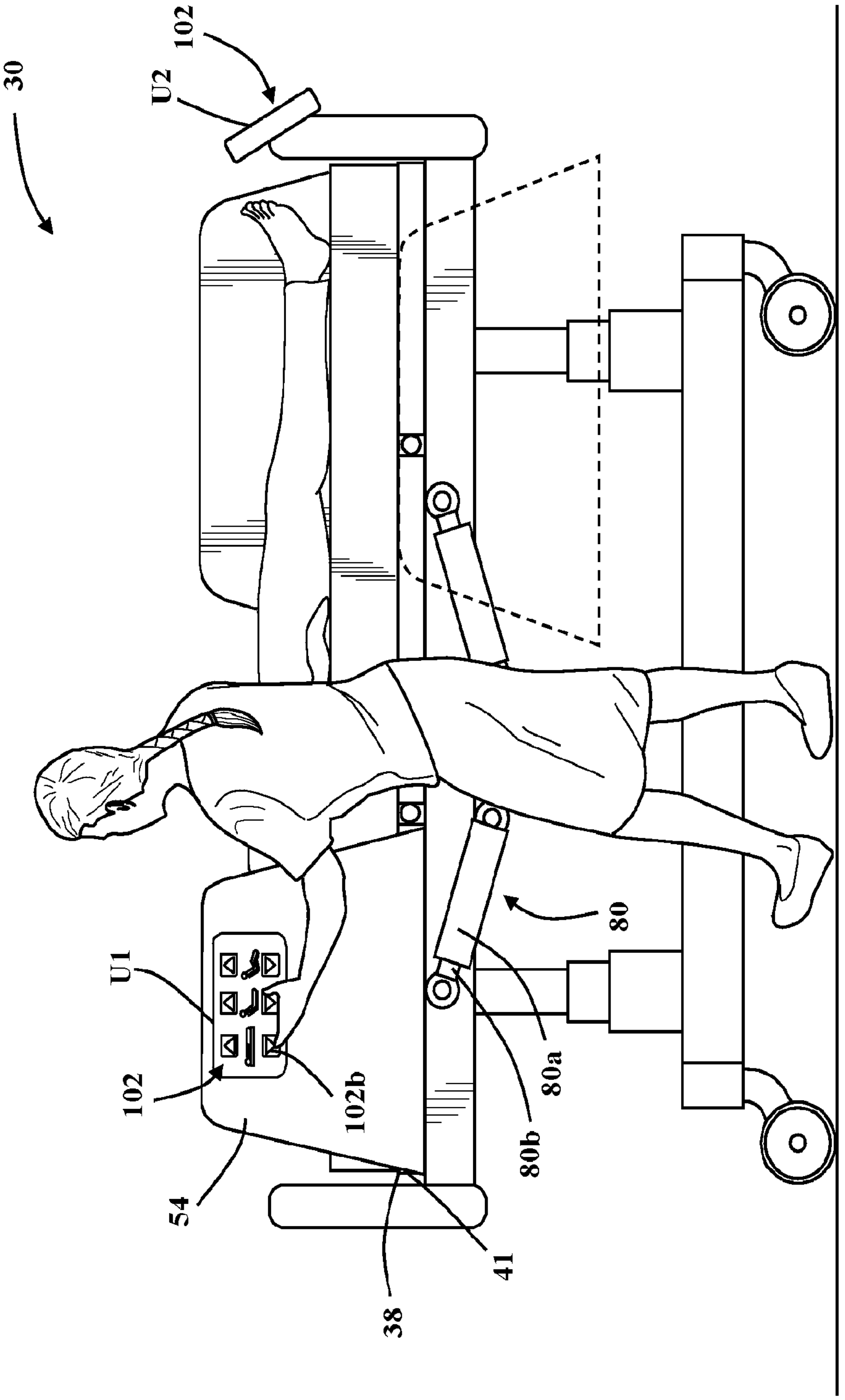
FIG. 4B illustrates that the back section has been moved to its lowered position in response to the user actuating the activator in FIG. 4A and further illustrates the user accessing a user interface to lower a patient support deck.
Figure 4C:
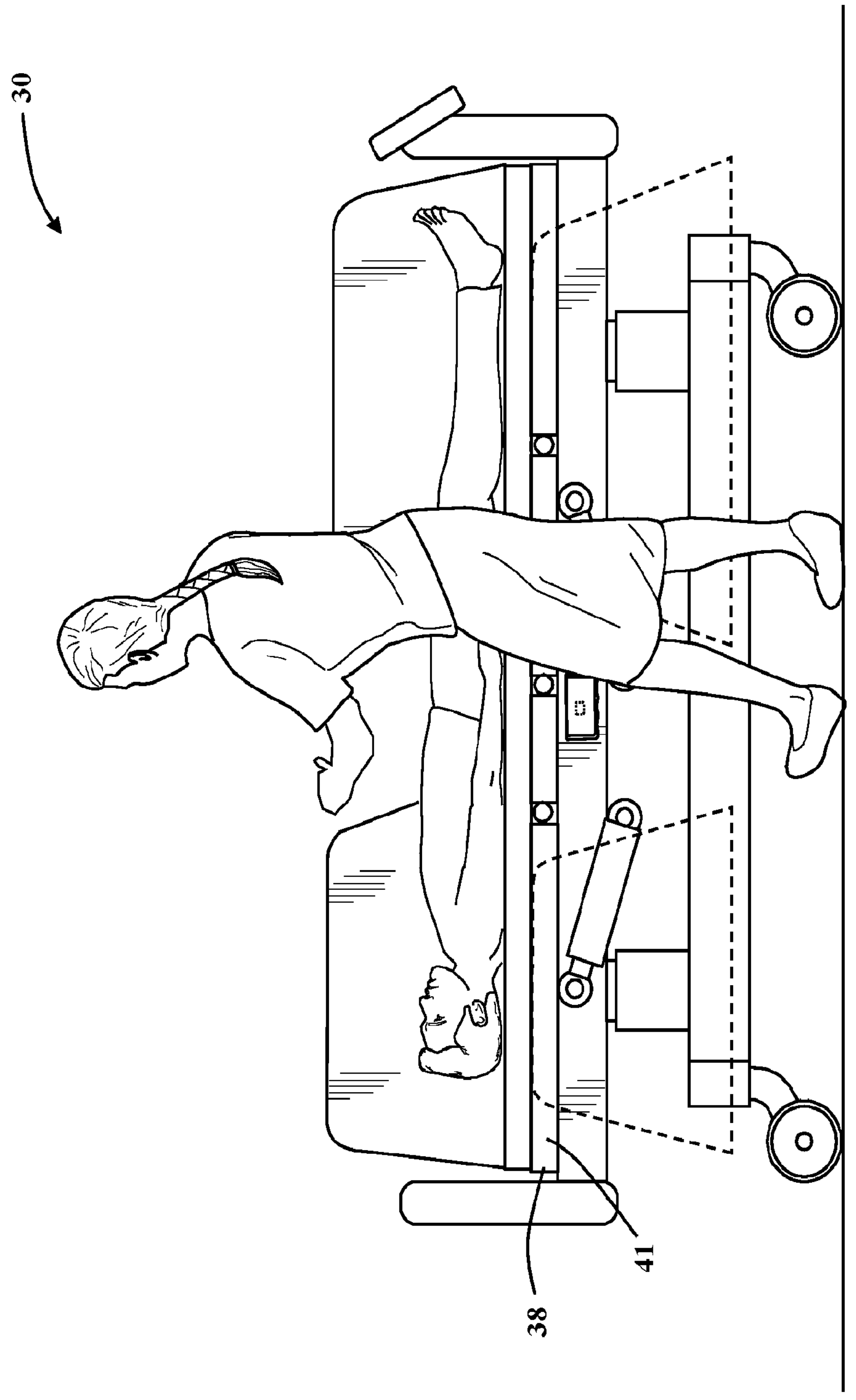
FIG. 4C illustrates that the patient support deck has been lowered to a low height position and further illustrates the user is ready to provide emergency care.

FIGS. 4A through 4C illustrate a sequence of steps taken by a user (e.g., a caregiver) during an emergency. FIG. 4A shows the user actuating the manual lever 122 to signal the emergency event. FIG. 4B shows the back section 41 after being moved to the lowered position in response to the user actuating the manual lever 122. As noted previously, when the user actuated the manual lever 122, the sensor S2 sent a corresponding signal to the controller 100 to signal the emergency event. As a result of receiving the signal, the controller 100 automatically reset all of the motion locks 108, 110, 112, 114 to their unlocked states so that the user can reconfigure the patient support deck 38 via the user input devices 102 on the first user interface U1 provided on the side rail 54 (or other side rails). Accordingly, for example, the user may be able to actuate the button 102*b* on the first user interface U1 to lower the patient support deck 38 to the low height position (compare FIG. 4B and FIG. 4C). As a result, with the back section 41 flat and the patient support deck 38 lowered, the user may be able to get easier access to the patient to provide emergency care, such as CPR.

The controller 100 may include a monitoring module 126 (see FIG. 3) configured to set a desired state of a plurality of conditions for the patient support apparatus 30. The monitoring module 126 may control one or more visual indicators 128 (and/or other indicators, such as audible and tactile indicators) to indicate when the patient support apparatus 30 is in an undesired configuration in response to detecting one or more of the plurality of conditions being in an undesired state. This provides an alert/alarm to caregivers of the patient. The monitoring module 126 forms part of a software program operable by the controller 100 and includes executable code to be executed by one or more processors of the controller 100. The monitoring module 126 may operate like the system disclosed in U.S. Patent Application Pub. No. 2015/0000035, entitled "Patient Handling Device Including Local Status Indication, One-Touch Fowler Angle Adjustment, And Power-On Alarm Configuration," filed on Sep. 17, 2014, incorporated herein by reference.

The plurality of conditions to be set and monitored by the monitoring module 126 may include a brake condition that can be sensed by a brake sensor S3 (e.g., braked or unbraked), a back section angle condition that can be sensed by the angle sensor S1 (e.g., the back section 41 is at 30-degrees or higher or below 30-degrees), a height condition that can be sensed by sensors S4 in the lift actuators 96, 98 (e.g., at the low height position or not at the low height position), a side rail condition that can be sensed by one or more side rail sensors S5 (e.g., raised or not raised), a bed exit condition that can be sensed by load cells S6 (e.g., patient in bed or not in bed), and the like.

Control of the visual indicators 128 to indicate whether or not the patient support apparatus 30 is in an undesired configuration could include changing color emitted from light emitting diodes (LEDs), activating/deactivating LEDs, changing output on the display 104, activating/deactivating other lights, flashing the LEDs or other lights in one or more colors, etc. For example, the visual indicators 128 could be controlled by the controller 100 to initially emit light of one color (e.g., green) when the monitoring module 126 determines that the patient support apparatus 30 is in its desired configuration and may change from emitting light of one color to emitting light of another color (e.g., changing from green to amber or red) when the patient support apparatus 30 is no longer in its desired configuration.

The controller 100 is configured to disable the monitoring module 126 in response to detecting the emergency event. For example, if the user initially sets the desired states for each of the plurality of conditions to establish the desired configuration of the patient support apparatus 30, and any one of the conditions falls outside of its set, desired state, then normally the one or more of the visual indicators 128 (and/or other indicators) would be controlled (e.g., changed, activated, deactivated, etc.) to alert caregivers that the patient support apparatus 30 is no longer in its desired configuration. However, when the user actuates the activator 120, the controller 100 disables the monitoring module 126 so that the monitoring module 126 is no longer monitoring the conditions to detect when they change from their desired to undesired states. This can be useful, for example, to avoid alarms that may otherwise be distracting to caregivers providing emergency care to the patient. For instance, suppose the desired state for the side rails is that all the side rails 54, 56, 58, 60 are raised. When the emergency event is signaled, the user will quickly act to lower one or more of the side rails 54, 56, 58, 60 (see FIG. 4C). By disabling the monitoring module 126, the alarm that would normally be activated when the user lowers one of the side rails 54, 56, 58, 60 would not be activated, i.e., the visual indicators 128 would not be controlled by the controller 100 to indicate the alarm.

The controller 100 may also include a bed exit module 130 configured to detect when the patient exits the patient support deck 38 or moves too far away from a center of gravity of the patient support deck 38. The bed exit module 130 controls one or more of the visual indicators 128 to alarm in response to detecting the patient exiting the patient support deck 38 or moving too far away from the center of gravity of the patient support deck 38. As with the monitoring module 126, the controller 100 is configured to disable the bed exit module 130, and any associated alarms, in response to detecting the emergency event. The bed exit module 130 forms part of a software program operable by the controller 100 and includes executable code to be executed by one or more processors of the controller 100. The bed exit module 130 may operate like the system disclosed in U.S. Patent Application Pub. No. 2015/0000035, entitled "Patient Handling Device Including Local Status Indication, One-Touch Fowler Angle Adjustment, And Power-On Alarm Configuration," filed on Sep. 17, 2014, incorporated herein by reference.

One or more therapy devices 132 may be coupled to the controller 100 to provide therapy to the patient supported on the patient support deck 38. The therapy devices 132 may include inflatable garments and associated pumps (e.g., a deep vein thrombosis sleeve and an air pump), patient warming systems that circulate warming/cooling fluids through pads placed on the patient and/or around the patient, turn assist bladders and pumps that provide rotation therapy to the patient, and the like. The one or more therapy devices 132 may be coupled to the controller 100 by wired and/or wireless connections. The controller 100 is configured to disable operation of the one or more therapy devices 132 in response to detecting the emergency event. For example, if the therapy device 132 includes a pump that operates to inflate/deflate one or more bladders, or a pump to circulate fluid for warming or cooling, the controller 100, by virtue of being in wired and/or wireless communication with the pump, will transmit a control signal to the pump to deactivate the pump so that the pump is no longer operating.

In some versions, the activator 120 may be an external device, separate from the patient support apparatus 30, that operates to signal the emergency event. For example, the activator 120 may be a monitor 140 that measures one or more physiological parameters (e.g., heart rate, blood pressure, oxygen saturation, temperature, etc.) of the patient on the patient support apparatus 30. In this case, the controller 100 is in communication with the monitor 140, via wired and/or wireless connections to receive values of the one or more physiological parameters and compare the values to threshold values (e.g., discrete values, ranges of values, etc.). The monitor 140 may thereby signal the emergency event to the controller 100 when the controller 100 receives a value, at, below, above, or outside the threshold value, that is indicative of the patient requiring emergency care. The controller 100 thereby detects the emergency event in response to the comparison of the measured/received values to the threshold values.

In some versions, the monitor 140 may utilize machine learning to learn normal values (e.g., discrete values, ranges of values, etc.) for the one or more physiological parameters of each patient. The threshold values for each patient could then be unique to each patient. For example, during times when the physiological parameters are normal, and not indicative of need for emergency care (e.g., CPR), the controller 100 may average the values over a period of time (e.g., an hour, hours, day, days, week, etc.) to establish the patient's normal values. The controller 100 may then set the threshold values as any values that deviate more than a predefined percentage or difference from the normal values. For instance, the threshold for heart rate may be equal to 40 beats per minute less than the patient's normal heart rate when lying on the patient support deck 38. If the patient's normal heart rate is 100 beats per minute, the threshold value may be set at 60 beats per minute (100 beats per minute−40 beats per minute). Accordingly, if the monitor 140 (e.g., a heart rate monitor) transmits a signal indicating the patient's heart rate has reached and/or fallen below 60 beats per minute, this may signal an emergency event, and the controller 100 can respond accordingly, as described herein, (e.g., reset motion locks 108, 110, 112, 114 to their unlocked states, lower the back section 41 to its lowered position, lower the patient support deck 38 to its low height position, etc.).

Figure 5:
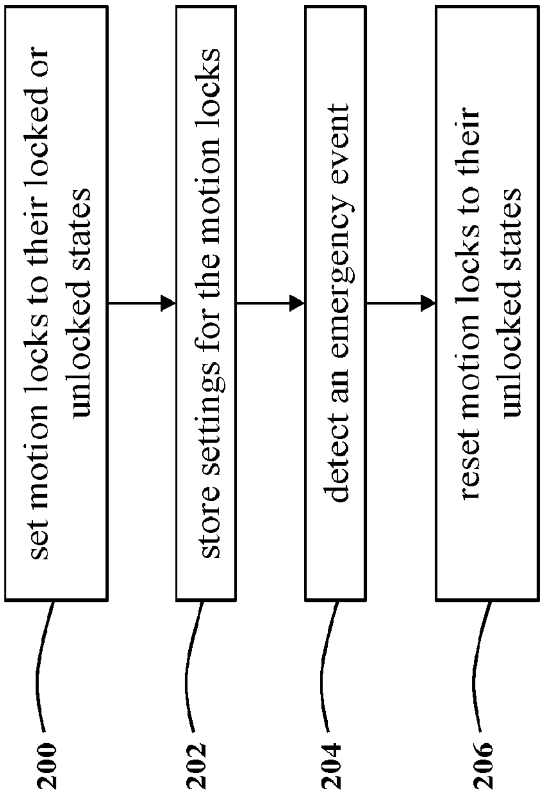
FIG. 5 is a flow chart showing an example of steps taken to sense and respond to the emergency event.

Referring to FIG. 5, example steps are shown in a method for sensing and responding to the emergency event on the patient support apparatus 30. The method includes, in step 200, setting the plurality of motion locks 108, 110, 112, 114. This includes providing the user access to the motion lock module 106 to allow the user to set the plurality of motion locks 108, 110, 112, 114 to their locked or unlocked states. In some cases when the patient support apparatus 30 is first powered, or when the software operating on the controller 100 is restarted, the motion locks 108, 110, 112, 114 may return to default settings, e.g., such as all being set to their unlocked states. In step 202, the controller 100 stores the settings for the plurality of motion locks 108, 110, 112, 114, including the default settings and/or user-defined settings. In step 204, the controller 100 electronically detects the emergency event in response to actuation of the activator 120 or in response to the activator 120 transmitting a signal indicative of an emergency event (e.g., via the monitor 140). For example, this may include the sensor S2 sensing the actuation of the activator 120 by the user and transmitting a corresponding signal to the controller 100 such that the controller 100 thereby detects the emergency event. This could also include the monitor 140 sending a measured value of a physiological parameter to the controller 100 that is indicative of an emergency event (e.g., deviates from normal values). In step 206, the controller 100 automatically resets any of the plurality of motion locks 108, 110, 112, 114 that are in the locked state to their unlocked states in response to detecting the emergency event.

Several versions have been discussed in the foregoing description. However, the versions discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A patient support apparatus for sensing and responding to an emergency event, the patient support apparatus comprising:

a support structure having a support frame and a patient support deck with a deck section capable of articulation relative to the support frame;

a plurality of actuators coupled to the support structure, including a lift actuator to lift and lower the patient support deck relative to a floor surface and a deck actuator to articulate the deck section relative to the support frame;

a user interface to cause operation of the plurality of actuators, an activator coupled to the support structure and arranged to be actuated by a user to signal the emergency event; and a controller coupled to the activator, the user interface, and the plurality of actuators, the controller comprising a motion lock module having a plurality of configurable electronic motion locks including a first motion lock associated with the lift actuator and a second motion lock associated with the deck actuator;

wherein the first motion lock has a lift locked state in which the user interface is inoperable to actuate the lift actuator, and a lift unlocked state in which the user interface is operable to actuate the lift actuator; and the second motion lock has a deck locked state in which the user interface is inoperable to actuate the deck actuator, and a deck unlocked state in which the user interface is operable to actuate the deck actuator, and the controller is configured to automatically reset the first motion lock and the second motion lock to their unlocked states in response to detecting the emergency event.

II. The patient support apparatus of clause I, wherein the activator includes a manual lever and a sensor arranged to sense actuation of the manual lever, the sensor being coupled to the controller.

III. The patient support apparatus of clause II, wherein the manual lever is operatively coupled to the deck actuator and operable to cause the deck section to articulate to a lowered position.

IV. The patient support apparatus of any of clauses II-III, wherein the deck section is a back section.

V. The patient support apparatus of any of clauses II-IV, the controller being configured to limit actuation of the lift actuator when in the lift locked state and to limit actuation of the deck actuator when in the deck locked state.

VI. The patient support apparatus of any of clauses II-V, including a footboard coupled to the support structure.

VII. The patient support apparatus of clause VI, including a second user interface coupled to the footboard, wherein the second user interface includes a user input device to access the motion lock module and configure the first motion lock and the second motion lock.

VIII. The patient support apparatus of any of clauses II-VII, wherein the controller is configured to automatically operate the deck actuator to articulate the deck section to a lowered position in response to detecting the emergency event.

IX. The patient support apparatus of any of clauses II-VIII, wherein the controller is configured to automatically operate the lift actuator to lower the patient support deck in response to detecting the emergency event.

X. The patient support apparatus of any of clauses II-IX, wherein the controller includes a monitoring module configured to set a desired state of a plurality of conditions for the patient support apparatus and control a visual indicator to indicate that the patient support apparatus is in an undesired configuration in response to detecting one or more of the plurality of conditions being in an undesired state, wherein the controller is configured to disable the monitoring module in response to detecting the emergency event.

XI. The patient support apparatus of any of clauses II-X, wherein the controller includes a bed exit module configured to detect when a patient exits the patient support deck and control a visual indicator to indicate that the patient has exited the patient support deck in response to detecting the patient exiting the patient support deck, wherein the controller is configured to disable the bed exit module in response to detecting the emergency event.

XII. The patient support apparatus of any of clauses II-XI, including a therapy device coupled to the controller to provide therapy to a patient supported on the patient support deck, wherein the controller is configured to disable operation of the therapy device in response to detecting the emergency event.

XIII A method for sensing and responding to an emergency event on a patient support apparatus, the patient support apparatus including a support structure having a support frame and a patient support deck with a deck section capable of articulation relative to the support frame, a lift actuator to lift and lower the patient support deck relative to a floor surface, a deck actuator to articulate the deck section relative to the support frame, a user interface, and an activator coupled to the support structure to be actuated by a user to signal the emergency event, the method comprising the steps of:

storing settings for a plurality of configurable electronic motion locks including a first motion lock associated with the lift actuator and a second motion lock associated with the deck actuator, wherein the first motion lock has a lift locked state in which the user interface is inoperable to actuate the lift actuator and a lift unlocked state in which the user interface is operable to actuate the lift actuator and the second motion lock has a deck locked state in which the user interface is inoperable to actuate the deck actuator and a deck unlocked state in which the user interface is operable to actuate the deck actuator;

detecting the emergency event; and automatically resetting the first and second motion locks to their unlocked states in response to detecting the emergency event.

XIV. The method of clause XIII, wherein detecting the emergency event includes sensing actuation of a manual lever.

XV. The method of clause XIV, comprising limiting actuation of the lift actuator when in the lift locked state and limiting actuation of the deck actuator when in the deck locked state.

XVI. The method of any of clauses XIV-XV, comprising providing access to a motion lock module to allow setting of the first motion lock and the second motion lock.

XVII. The method of any of clauses XIV-XVI, comprising automatically operating the deck actuator to articulate the deck section to a lowered position in response to detecting the emergency event.

XVIII. The method of any of clauses XIV-XVII, comprising automatically operating the lift actuator to lower the patient support deck in response to detecting the emergency event.

XIX. The method of any of clauses XIV-XVIII, comprising:

storing, in a monitoring module, settings for a desired state of a plurality of conditions for the patient support apparatus;

controlling a visual indicator, with the monitoring module, to indicate that the patient support apparatus is in an undesired configuration in response to detecting one or more of the plurality of conditions being in an undesired state; and disabling the monitoring module in response to detecting the emergency event.

XX. The method of any of clauses XIV-XIX, comprising:

detecting when a patient exits the patient support deck using a bed exit module;

controlling a visual indicator, with the bed exit module, to indicate that the patient has exited the patient support deck in response to detecting the patient exiting the patient support deck; and disabling the bed exit module in response to detecting the emergency event.

XXI. The method of any of clauses XIV-XX, comprising disabling operation of a therapy device in response to detecting the emergency event.

XXII. A system for sensing and responding to an emergency event, the system comprising:

an activator to signal the emergency event; and a patient support apparatus including:

a support structure having a support frame and a patient support deck with a deck section capable of articulation relative to the support frame;

a plurality of actuators coupled to the support structure, including a lift actuator to lift and lower the patient support deck relative to a floor surface and a deck actuator to articulate the deck section relative to the support frame;

a user interface to cause operation of the plurality of actuators; and a controller coupled to the activator, the user interface, and the plurality of actuators, the controller being configured to detect the emergency event and comprising a motion lock module having a plurality of configurable electronic motion locks including a first motion lock associated with the lift actuator and a second motion lock associated with the deck actuator;

wherein the first motion lock has a lift locked state in which the user interface is inoperable to actuate the lift actuator, and a lift unlocked state in which the user interface is operable to actuate the lift actuator; and the second motion lock has a deck locked state in which the user interface is inoperable to actuate the deck actuator, and a deck unlocked state in which the user interface is operable to actuate the deck actuator, and the controller is configured to automatically reset the first motion lock and the second motion lock to their unlocked states in response to detecting the emergency event.

XXIII. The system of clause XXII, wherein the activator is a heart rate monitor to measure a heart rate of a patient on the patient support deck, and the controller is configured to detect the emergency event in response to the heart rate of the patient falling below a threshold.

What is claimed is:

1. A patient support apparatus for sensing and responding to an emergency event, the patient support apparatus comprising:

a support structure having a base arranged for movement along a floor surface, a support frame, and a patient support deck with a deck section capable of articulation relative to the support frame;

a plurality of actuators coupled to the support structure, including a lift actuator to lift and lower the support frame and the patient support deck relative to the base between a high height position and a low height position, and a deck actuator to articulate the deck section relative to the support frame;

a user interface to cause operation of the plurality of actuators;

an activator coupled to the support structure and arranged to be actuated by a user to signal the emergency event, the activator including a manual lever operatively attached to the support frame and a sensor arranged to sense actuation of the manual lever; and a controller coupled to the sensor of the activator, the user interface, and the plurality of actuators, the controller comprising a motion lock module having a plurality of configurable electronic motion locks including a first motion lock associated with the lift actuator and a second motion lock associated with the deck actuator;

wherein the first motion lock has a lift locked state in which the user interface is inoperable to actuate the lift actuator to lift and lower the support frame relative to the base, and a lift unlocked state in which the user interface is operable to actuate the lift actuator to lift and lower the support frame relative to the base; and the second motion lock has a deck locked state in which the user interface is inoperable to actuate the deck actuator to articulate the deck section relative to the support frame, and a deck unlocked state in which the user interface is operable to actuate the deck actuator to articulate the deck section relative to the support frame, wherein the controller is configured to automatically reset the first motion lock and the second motion lock to their unlocked states in response to detecting the emergency event; and wherein the controller is configured to automatically operate the lift actuator to lower the support frame and a patient disposed on the patient support deck toward the base to the low height position in response to detecting the emergency event with the activator.

2. The patient support apparatus of claim 1, wherein the manual lever is operatively coupled to the deck actuator and operable to cause the deck section to articulate to a lowered position.

3. The patient support apparatus of claim 1, wherein the deck section is a back section.

4. The patient support apparatus of claim 3, wherein the controller is configured to permit limited actuation of the deck actuator when in the deck locked state to prevent lowering the back section beyond a predetermined angle.

5. The patient support apparatus of claim 1, including a footboard coupled to the support structure.

6. The patient support apparatus of claim 5, including a second user interface coupled to the footboard, wherein the second user interface includes a user input device to access the motion lock module and configure the first motion lock and the second motion lock.

7. The patient support apparatus of claim 1, wherein the controller is configured to automatically operate the deck actuator to articulate the deck section to a lowered position in response to detecting the emergency event with the activator.

8. The patient support apparatus of claim 1, wherein the controller includes a monitoring module configured to set a desired state of a plurality of conditions for the patient support apparatus and control a visual indicator to indicate that the patient support apparatus is in an undesired configuration in response to detecting one or more of the plurality of conditions being in an undesired state; and wherein the controller is configured to automatically disable the monitoring module in response to detecting the emergency event with the activator.

9. The patient support apparatus of claim 1, wherein the controller includes a bed exit module configured to detect when the patient exits the patient support deck and control a visual indicator to indicate that the patient has exited the patient support deck in response to detecting the patient exiting the patient support deck; and wherein the controller is configured to automatically disable the bed exit module in response to detecting the emergency event with the activator.

10. The patient support apparatus of claim 1, including a therapy device coupled to the controller to provide therapy to the patient supported on the patient support deck; and wherein the controller is configured to automatically disable operation of the therapy device in response to detecting the emergency event with the activator.

11. The patient support apparatus of claim 10, wherein the therapy device includes a temperature management system for one or more of warming and cooling the patient.

12. The patient support apparatus of claim 1, further comprising a mattress disposed on the patient support deck for supporting the patient, the mattress including an inflation system coupled to the controller; and wherein the controller is configured to automatically operate the inflation system to deflate the mattress in response to detecting the emergency event with the activator.

13. The patient support apparatus of claim 1, wherein the activator includes a patient sensor disposed in communication with the controller and configured to measure one or more physiological parameters of the patient on the patient support deck; and wherein the controller is configured to detect the emergency event based on a comparison of the one or more physiological parameters of the patient received from the patient sensor against one or more threshold values.

14. The patient support apparatus of claim 13, wherein the controller is further configured to:

determine one or more patient-specific normal values for the one or more physiological parameters based on one or more averaged values received from the patient sensor over a period of time, determine one or more patient-specific threshold values based on a predefined deviation from the one or more patient-specific normal values, and detect the emergency event based on the one or more patient-specific normal values exceeding the one or more patient-specific threshold values.

15. The patient support apparatus of claim 13, wherein the patient sensor includes a heart rate monitor to measure a heart rate of the patient on the patient support deck.

* * * * *